United States Patent
Reinbold et al.

[11] Patent Number: 6,087,635
[45] Date of Patent: Jul. 11, 2000

[54] METHOD AND APPARATUS FOR THE ARC-LIKE SHAPING OF PROFILED STRANDS OR STRAND SECTIONS CONSISTING OF A THERMOPLASTIC MATERIAL

[76] Inventors: Theo Reinbold, Am Hagdorn 6, 75015 Bretten; Bernd Reinbold, Eigenmannstrasse 47, 75038 Oberderdingen, both of Germany

[21] Appl. No.: 09/071,322

[22] Filed: May 1, 1998

[51] Int. Cl.[7] .......................... B29C 33/02; B29C 33/06; F27B 9/02; F27B 9/10; F27D 13/00

[52] U.S. Cl. .......................... 219/400; 219/396; 219/411; 264/479; 264/481; 264/339; 264/295

[58] Field of Search ..................................... 219/385, 386, 219/388, 400, 392–396, 397, 411; 264/313, 339, 295, 297.5, 479, 481, 492, DIG. 66; 432/8, 9

[56] References Cited

U.S. PATENT DOCUMENTS

| | | | |
|---|---|---|---|
| 4,092,390 | 5/1978 | Mulvany, Jr. | ............................ 219/400 |
| 4,786,456 | 11/1988 | Witte | ........................................ 264/295 |

FOREIGN PATENT DOCUMENTS

| | | |
|---|---|---|
| 2053318 | 5/1974 | Germany . |
| 2729548 | 1/1979 | Germany . |
| 2739548 | 7/1979 | Germany . |
| 3322572 | 12/1984 | Germany . |
| 3406729 | 9/1985 | Germany . |
| 1375597 | 11/1974 | United Kingdom . |

*Primary Examiner*—Joseph Pelham
*Attorney, Agent, or Firm*—Klaus J. Bach

[57] ABSTRACT

In a method for the arc-like shaping of an extruded profiled strand of plastic material at least a section of the strand is heated in a hot air chamber together with a support ledge disposed in spaced relationship from the profiled strand to a temperature permitting the bending of the profiled strand and the strand is then firmly engaged between a support ledge at the inner compression side and a support profile at the other, that is the tension side of the profile strand to form a package, which is then bent while the temperature at the compression side of the profile strand is higher than the temperature at the tension side thereof to prevent the formation of waves in the profile strand walls. The invention also resides in a heating apparatus, which provides for the temperature difference at opposite sides of the profile strand and includes means for engaging the profile strand during bending.

4 Claims, 2 Drawing Sheets

METHOD AND APPARATUS FOR THE ARC-LIKE SHAPING OF PROFILED STRANDS OR STRAND SECTIONS CONSISTING OF A THERMOPLASTIC MATERIAL

BACKGROUND OF THE INVENTION

The invention resides in a method and apparatus for the arc-like shaping of profiled strands or strand sections consisting of a thermoplastic material particularly hollow window frame profile strands wherein at least the strand section to be bent is heated to a temperature permitting the shaping of the strand utilizing a heated temperature resistant support structure around which the strand section is bent and from which it is separated after being cooled and to an apparatus for performing the method.

Such methods and apparatus are known in principle for example from DE 33 22 572 C2. Here, a profile strand is softened in a heat bath, pre-shaped and then bent to its final shape using shaping templates. As heating liquid in the bath, normally oil is used whose boiling temperature is higher than the softening temperature of the thermoplastic material such as PVC. To prevent the formation of waves or the buckling at the compression side, that is the radially inner side, of the profile strand to be bent heated oil is conducted onto the strand on the bending apparatus during bending. However, the use of oil is not without problems. On one hand, vapors and deposits which may adversely affect the health of the workers are generated and, on the other hand, the shaped profile strands have to be cleaned after they cool down, which also results in problems with the disposal of the residues. A dry heating of the profile strands for example in hot air chambers as it is mentioned in DE 20 53 318, in which various heating possibilities are listed (see column 2, lines 49) would therefore be desirable. However, in practice, problems occur with heated oil operated heating baths as well as with hot air chambers since the formation of waves along the compression side of the profile strand cannot be prevented with either method, particularly with relatively tight arcs which require relatively large shape changes. Undesirable shape changes occur also at the front sides (that is, on the side disposed on the bending table and on the opposite parallel side) of the profile strands adjacent the inner profile web.

DE 27 29 548 A1 proposes to use support ledges on which the profile strands are slidably disposed during their bending while being heated. The ledges abut a profile strand essentially from all sides and consist of heat resistant profiled rubber or rubber-like materials having a relatively low bending resistance. If a PVC profile strand is supported by such a rubber profile ledge in a hot air chamber at a temperature of 110° C. the PVC profile strand can be bent as desired utilizing also a template. The rubber profile can be removed after the PVC profile strand has cooled down. However, with this method, the heat-up period is relatively long, since first the rubber profile has to be thoroughly heated so that it can transmit the heat to the profile strand. It is further disadvantageous that also the side portions of the PVC profile strand are surrounded by the rubber profile. This can lead during the bending process to undesirable small pleats or waves in the compression area which are not tolerated by the consumer.

It is the object of the present invention to provide a method for heating profiled strands of thermoplastic material in a hot air chamber rapidly and bending them without undesirable changes that is without the formation of waves or buckles in the compression areas of the profile strand.

SUMMARY OF THE INVENTION

In a method for the arc-like shaping of an extruded profiled strand of plastic material at least a section of the strand is heated in a hot air chamber together with a support ledge disposed in spaced relationship from the profiled strand to a temperature permitting the bending of the profiled strand and the strand is then firmly engaged between a support ledge at the inner compression side and a support profile at the other, that is the tension side of the profile strand to form a package, which is then bent while the temperature at the compression side of the profile strand is higher than the temperature at the tension side thereof to prevent the formation of waves in the profile strand walls. The invention also resides in a heating apparatus, which provides for the temperature difference at opposite sides of the profile strand and includes means for engaging the profile strand during bending.

With the method and apparatus according to the invention even relatively tight arcs can be produced with smooth surfaces free of waves or ripples. Since the outside support ledge profile has no radial slots, there are furthermore no impressions on the shaped section of the profile strand. No secondary products are generated which must be handled separately or disposed of properly.

The invention will be described below in greater detail on the basis of the accompanying drawings.

DESCRIPTION OF A PREFERRED EMBODIMENT

Figure 1:
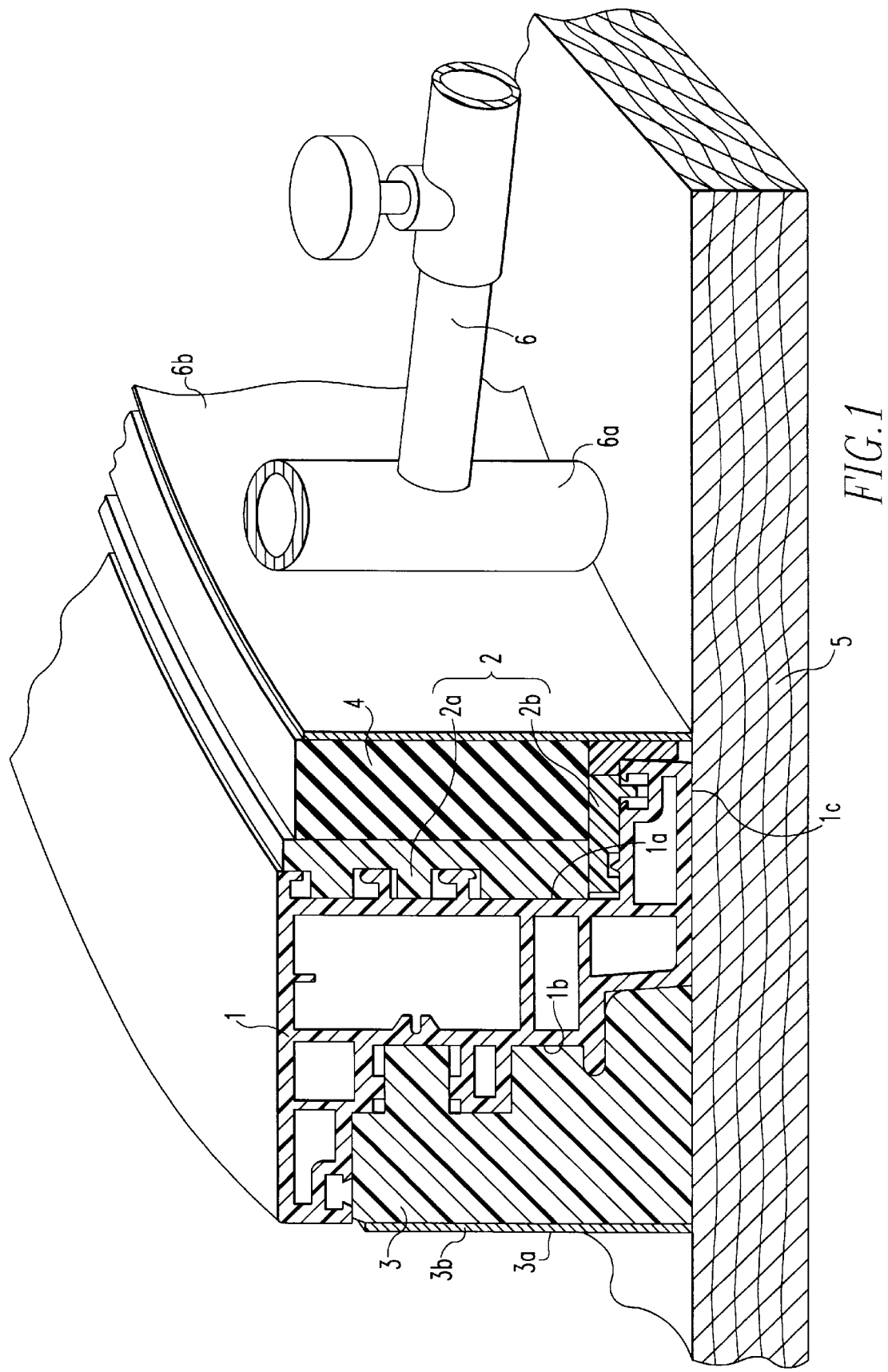
FIG. 1 shows a number of profile strands in a bending apparatus.

The profile strand package as shown in FIG. 1 consists of a profile strand 1 of thermoplastic material which in the example given is a hollow window frame strand consisting for example of PVC, an elastically bendable temperature resistant two-piece support ledge 2, a support profile 3 and a rubber support strip 4. The support ledge 2, which also consists of plastic material, for example of PTFE, is relatively thin-walled so that it can be heated as rapidly as the profile strand 1. The support profile 3 consists of an elastic smooth (that is slot-free) plastic profile rod of silicon rubber whose radially outer side (tension stress side 3a) is abutted by a steel spring band 3b. The support ledge 2 is engaged at its radially inner side by the rubber support strip 4. In the example given, the support ledge comprises two parts 2a, 2b in order to make it possible for its projection to be inserted into the respective recesses of the angled profiled strand 1.

The bending apparatus essentially corresponds to one as shown in DE 33 22 572 C2. It includes a bending table 5 on which adjustable struts 6 are disposed. The adjustable struts 6 have heads 6a which determine the arc curvature of a spring steel strip 6b serving as a template.

The section of the profile strand to be bent is heated in the hot air heating chamber together with the two parts 2a, 2b, of the support ledge 2, which however are not yet assembled until a shaping temperature is reached which for PVC is about 110 to 120° C. The steel band backed plastic support profile 3 is also heated, but only to a temperature of, for example, 70° C. As a result, after form-locking engagement the neutral area of the profile strand section to be bent is moved radially outwardly toward the tension stress side 1b.

After heating, all the profiles or ledges 1, 2, 3, 4 are joined, while still being straight, into a form-locking state and are held in this state using U-clamps (not shown). As apparent from FIG. 1, this is done in such a way that the two piece support ledge 2a, 2b is brought into engaging contact with the radially inner side (compression side 1a) of the profile strand 1. The rubber support strip 4 which is not heated serves as a reinforcement structure for the support ledge pieces 2a, 2b. The hollow spaces of the profile strand 1 can be filled with a form-stabilizing material.

The support profile 3 engages the profile strand 1 along the outer side (tension stress side 1b). Then the whole profile strand support ledge and support profile and strip package 1 to 4 is transferred from the heating chamber to the bending table 5 of a bending apparatus and the heated section is bent around the spring steel strip 6b forming a template. The spring steel band 3b of the profiled support ledge 3 has its opposite ends mounted onto the bending table 5 and is pulled around the steel strip 6b in this process. The bending lasts only for a few seconds; then the profile strand is plane-pressed on the table 5 in a well known manner. After cool-down and solidification of the profile strand 1, the parts 1 to 4 are removed. The support ledge 2, the support profile 3 and the rubber support strip 4 return to their straight state and are again used for the forming of the next profile strand 1.

Figure 2:
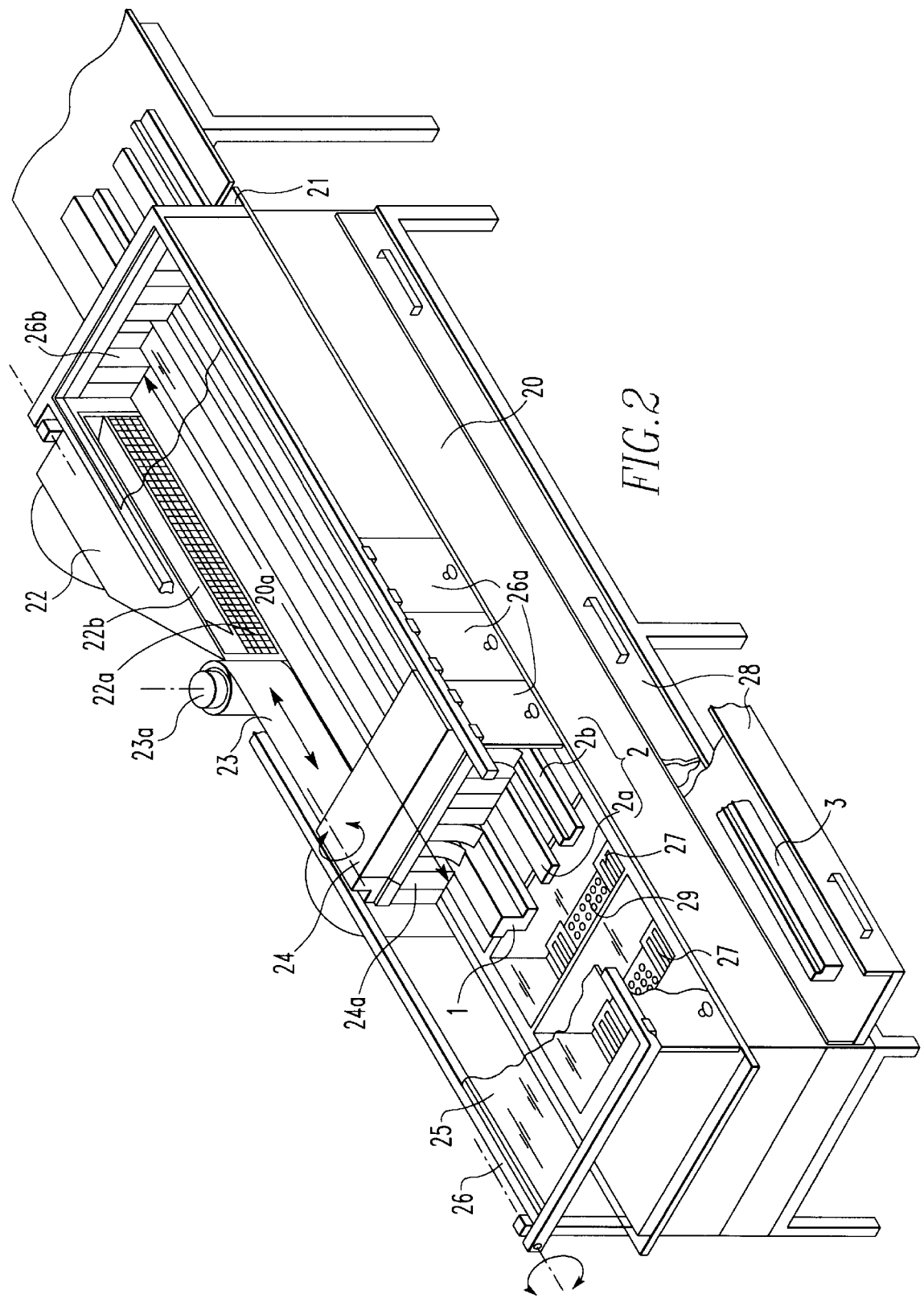
FIG. 2 is a perspective view of a profile strand heating apparatus.

The air heat apparatus as shown in FIG. 2 has the shape of an elongated box 20 mounted onto a support structure. For receiving the profile strand 1 and the support ledge 2 (ledge pieces 2a, 2b) a support plate 21 of glass or ceramic on which a parting compound is disposed is provided. The rear longitudinal side of the box 20 is formed by several registers 22a of a hot air inlet 22 and a steel band 23 unrolled from a steel band coil 23a disposed adjacent the register area. At the free end of the band 23, there is an air discharge box 24 which can be flipped open and which is movable along the support plate 21. By moving the air discharge box 24 on a guide track arranged behind the table the effective heating zone 20a can be continuously adjusted along the profile strand 1. instead of the steel band 23 that can be rolled onto or from the coil 23a foldable or telescope-like slidable side walls can be used. The air sucked off by way of the air discharge box 24 is heated externally and, by way of a blower (not shown), returned to the hot air inlet 22. The upper cover plate 25 which consists of glass and the longitudinal front side are part of a pivotable box lid 26. The longitudinal front side comprises a number of pivot flaps 26a which are disposed side-by-side and hinged to the box lid 26 so that they are pivotable about a horizontal axis. When the box lid 26 is opened, the heated profile strands can be moved from the support plate 21 to the adjacent bending table plate 5 of the bending apparatus. The parting compound such as a self-adhesive foil remains on the support plate 21.

The end walls of the box 20, which determine the heating length 20a are formed by elastic members 24a and 24b, which are attached to the air discharge box 24 and, respectively, the lid 26 and which have free ends in contact with the support plate 21 or, respectively, the profile strand 1, and the support ledge and profile 2 to contain the heated air. The flaps 26a provide for access to the profile strand 1, outside the heating area 20a even when the lid 26 is closed.

Below the support plate 21, there are provided infrared radiation heaters 27 with which the undersides of the profile strands 1, and the ledge 2 are heated in the heating zone 20a. Below the infrared radiation heaters 27, there is a drawer 28 for receiving the support ledge profile 3. Between the drawer 28 and the infrared radiation heaters 27, there is a foraminated plate 29 through which sufficient radiation heat passes for heating the support profile 3 disposed in the drawer.

The air inlet nozzle 22 includes at least one guide plate 22b, which is tiltable about a horizontal axis and which deflects a part of the heated air toward the upper cover plate 25. As a result, the air is guided toward the front side of the profile strand 1 (compression side 1a), which consequently is heated to a greater degree than the rear side (tension side 1b). The temperature of the profile strand bottom side 1c (see FIG. 1) is determined by the power output of the infrared radiation heaters 27.

What is claimed is:

1. A heating apparatus for heating extruded profiled strands of a thermoplastic material, particularly hollow window frame profile strands, said apparatus comprising: a box-like housing including a glass or ceramic support plate for supporting said strands of thermoplastic material, said support plate being provided with a parting compound and said housing having an air inlet along a rear side surface thereof, an air discharge box movably disposed in said box-like housing, a coil with a band coiled thereon disposed adjacent said air inlet, said band having an end connected to said air discharge box so as to be pulled from said coil when said air discharge box moves away from said air inlet, a lid hinged to said box-like housing along its rear side surface and having a front side forming a side wall of said housing opposite said inlet and said band, and infrared radiation heater elements disposed below said support plate for providing additional heat to said profiled strand on said support plate.

2. A heating apparatus according to claim 1, wherein said air discharge box and said lid include elastic members extending therefrom downwardly toward said support plate and have free ends engaging said support plate and, respectively, the profiled strand disposed thereon for containing the heated air, the distance between said elastic elements as determined by the position of said movable air discharge box defining the length of the heating space on said support plate.

3. A heating apparatus according to claim 1, wherein a drawer is disposed below said infrared radiation heaters for receiving said support profile and a foraminated plate is disposed between said infrared radiation heaters and said drawer.

4. A heating apparatus according to claim 1, wherein said air inlet includes a flow guide plate supported pivotally around a horizontal axis and adapted to guide part of the heated air supplied to said box-like housing toward a cover plate for said box-like housing which deflects the heated air to the front side of said box-like housing.

* * * * *